United States Patent Office 3,415,760
Patented Dec. 10, 1968

3,415,760
TWO STAGE HEAT TREATMENT OF COBALT MOLYBDATE CATALYSTS
David James Hadley, Epsom Downs, Surrey, and Rowland Harris Jenkins, West Ewell, Surrey, England, assignors to The Distillers Company Limited, Edinburgh, Scotland, a British company
No Drawing. Continuation of application Ser. No. 337,999, Jan. 16, 1964, which is a division of application Ser. No. 134,592, Aug. 29, 1961. This application June 28, 1967, Ser. No. 649,743
Claims priority, application Great Britain, Sept. 8, 1960, 30,923/60; Sept. 29, 1960, 33,411/60
6 Claims. (Cl. 252—470)

ABSTRACT OF THE DISCLOSURE

Process for preparing an oxidation catalyst containing cobalt, molybdenum and oxygen in which the atomic ratio of cobalt to molybdenum is not substantially greater than 1:1, by adding a nitrogenous base to a solution of a cobalt salt and molybdic acid or molybdates of a nitrogenous base to obtain a solution of pH less than about 7, forming a precipitate in said solution, heating the precipitate to 350° to 650° C., pelleting the material preferably after grinding, and then subjecting the pelleted material to a second heat treatment in the range of 500° to 650° C.

---

This application is a continuation of application Ser. No. 337,999 filed Jan. 16, 1964, now abandoned, which is a division of application Ser. No. 134,592 filed Aug. 29, 1961, now abandoned.

The present invention relates to the production of unsaturated aliphatic acids such as acrylic acid and methacrylic acid.

According to the present invention the process for the production of acrylic acid or methacrylic acid comprises reacting at an elevated temperature in the vapour phase acrolein or methacrolein with molecular oxygen over an oxidation catalyst comprising an oxide composition containing cobalt, molybdenum and oxygen in which the atomic ratio of cobalt to molybdenum is not substantially greater than 1:1 prepared by adding a nitrogenous base to a solution of a cobalt salt with molybdic acid or a molybdate of a nitrogenous base to obtain a solution of pH less than about 7, forming a precipitate in said solution, heating the said precipitate at about 350° to 650° C., subjecting the resulting material to frictional forces and heating it at about 500° to 650° C.

The catalytic oxide composition containing cobalt, molybdenum and oxygen of the present invention is suitably formed by mixing an aqueous solution of a cationic cobalt salt, such as the nitrate, chloride, or acetate, with an aqueous solution or suspension of molybdic acid or a molybdate, adding a nitrogenous base to the aqueous mixture in a proportion for example between about 0.5 and about 1.5 gramme-equivalents of base per gramme-atom of cobalt such that the pH of the mixture does not exceed about 7, filtering off and drying the resulting precipitate, and subjecting this to the double heat treatment according to the invention. Besides ammonia a wide variety of nitrogenous bases can be used, such as the aliphatic amines, for instance ethylamine and triethylamine, ethanolamine ethylene diamine, aromatic or heterocyclic amines such as aniline and pyridine, and cycloaliphatic amines, such as piperidine. The preferred nitrogenous base is ammonia. The temperature at which the precipitation is carried out is not critical, and temperatures between room temperature and about 100° C. are suitable. It is preferred to carry out the precipitation at temperatures above room temperature, as the precipitate produced at these temperatures is more easily filtered.

After being dried, for instance at about 100° C., the composition is subjected to a first heat-treatment at about 350–650° C., after which the material is subjected to frictional forces, for instance by being formed into pellets preferably after first being ground. The catalyst is then subjected to a second heat-treatment at about 500 to 650° C. preferably at about 600° C. It is found that by use of this preferred two-stage heat-treatment a harder catalyst is obtained and that the granules of catalyst have less tendency to break up through attrition.

The precipitated catalyst composition, which is blue in colour (Blue I) after being dried, is subjected to the first heat-treatment in which it undergoes a phase change to produce a material also blue in colour (Blue II), but which gives a different X-ray diffraction pattern. On subjecting this material to frictional forces, e.g. by grinding or pelleting, a further phase change together with a change in colour to green or black depending on the state of subdivision of the particles, is obtained. Heating this ground material produces a reversal of phase change to give the material Blue II produced after the first heat-treatment. This second heat-treated material however possesses substantially increased resistance to wear, i.e. when the Blue II phase is approached from the green or black phase the pellets are harder than if the approach is from Blue I to Blue II.

The atomic ratio of cobalt to molybdenum in the catalyst may vary within moderately wide limits, for instance from 0.5:1 to 1:1 but should not be substantially greater than 1:1.

The catalyst composition of the present invention is particularly useful in the process for the production of acrylic or methacrylic acid by the vapour phase reaction of acrolein or methacrolein, or compounds yielding these substances under reaction conditions, e.g. propylene or isobutene, with molecular oxygen.

The reaction may be carried out in any suitable manner, for instance under isothermal or adiabatic conditions and as a fixed or fluidised bed process. The proportion of aldehyde in the feed may vary within wide limits, for example between 1 and 20% by volume, and preferably between about 2 and 10% by volume. The concentration of oxygen in the feed may vary within moderately wide limits, for example between 1 and 20% by volume and preferably 2 and 15% by volume. The molecular oxygen containing gas may be supplied as air.

The reaction is suitably carried out in the presence, as diluent, of a gas which is substantially inert under the conditions of reaction, for example, nitrogen, propane, butane, isobutane, carbon dioxide and steam. It is preferred to use steam or nitrogen or mixtures thereof. The concentration of the steam may vary within wide limits, for instance between 20 and 60% by volume of the feed.

The reaction is carried out at an elevated temperature, for instance between 250 and 600° C. and preferably between 300 and 500° C.

The contact time may be for example in the range 1–30 seconds.

The process of the present invention is further illustrated by the following examples. In the examples, parts by weight and parts by volume bear the same relation to each other as to kilograms to litres.

Example 1

145.5 parts by weight of cobalt nitrate was dissolved in 60 parts by weight of water at 60° C., and 88.3 parts by weight of ammonium molybdate, powdered to 30 mesh B.S.S. was dissolved in 260 parts by weight of water at 60° C. The two solutions were mixed and maintained at 60° C. with stirring, while 68.4 parts by weight of triethylamine was added over a period of 30 minutes; stirring was continued for a further 15 minutes. The resultant mixture gave a pH of 5.2 with a glass electrode under the conditions specified above. The precipitate was collected and washed twice by resuspension in 333 parts by weight of water. The washed precipitate was dried at 110° sieved through 8 mesh B.S.S. and heat treated at 600° C. for 16 hours. The heat treated material was then ground to 30 mesh B.S.S. pelleted and subjected to a second heat treatment at 600° for 16 hours.

A gaseous mixture of 10.1% by volume of acrolein, 48.6% by volume of nitrogen, 9.9% by volume of oxygen and 31.4% by volume of steam was passed over the catalyst in a reactor at 397° the contact time being 3.5 seconds.

Of the acrolein fed to the reactor 60.0% was converted to acrylic acid; 9.2% was recovered unchanged. The yield of acrylic acid based on the acrolein consumed was 66.1%.

The hardness of the catalyst, measured by an attrition test in a rod mill under standard conditions was 93%. A second catalyst was prepared in a similar manner, but given only a single heat treatment; whereas the performance of the catalyst in converting acrolein to acrylic acid was similar to the twice-heated catalyst, the hardness was only 66% measured by the same test.

Example 2

582 parts by weight of cobalt nitrate was dissolved in 240 parts by weight of water, and the solution was heated to 60° C. 353.2 parts by weight of ammonium molybdate was dissolved in 1040 parts by weight of distilled water at 60° C.; the two solutions were mixed and well stirred. 380 parts by volume of ethanol-amine (5.0 N aqueous solution) was added dropwise over 30 minutes and the temperature of the mixture kept at 55°–60° C. The mixture was stirred for a further 15 minutes after the addition was completed. The resutlant mixture gave a pH of 6.0 with a glass electrode under the conditions specified above. The precipitate was filtered off, washed twice by resuspension with 1500 parts of water, and dried in an oven at 110° C. The resulting granules were ground to 8 mesh B.S.S. and heated at 400° C. for 16 hours. The heat treated material was ground to 30 mesh B.S.S. pelleted and the pellets given a second heat treatment at 600° C. for 16 hours.

A gaseous mixture of 10% by volume of acrolein, 10% by volume of oxygen, 50% by volume of nitrogen, and 30% by volume of steam was passed over the catalyst maintained in a reactor at 360° C. the contact time being 3.5 seconds.

Of the acrolein fed to the reactor 59.5% was converted to acrylic acid, and 13.7% was recovered unchanged. The yield of acrylic acid based on acrolein consumed was 69.0%.

As a comparison a record catalyst was prepared as described above except that 600 parts of ethanolamine were employed leading to a pH of the final mixture of 7.9. After drying and heat treating, the catalyst was found to be almost completely inactive giving only a 3% yield of acrylic acid based on the acrolein fed at 380° C.

Example 3

291 parts by weight of cobalt nitrate was dissolved in 120 parts by weight of distilled water, and the solution was heated to 60° C.; 176.5 parts by weight of ammonium molybdate was dissolved in 520 parts by weight of distilled water at 60° C. The two solutions were mixed and well stirred.

397 parts by volume of diethylamine (2.52 N aqueous solution) was added dropwise over a period of 30 minutes and the temperature of the mixture kept at 55°–60° C. The mixture was stirred for a further 15 minutes after the addition was completed. The precipitate was filtered off, washed twice by resuspension with 1000 parts by weight of distilled water, and dried at 110° C. The resulting granules were ground to 8 mesh B.S.S. and heated at 600° C. for 16 hours. The granules were then ground to 30 mesh B.S.S. pelleted, and the pellets subjected to a second heat treatment at 600° C. for 16 hours.

A gaseous mixture of 10% by volume of acrolein, 10% by volume of oxygen, 50% by volume of nitrogen, and 30% by volume of steam was passed over the catalyst maintained in a reactor at 380° C., the contact time being 3.6 seconds.

Of the acrolein fed to the reatcor 63.4% was converted to acrylic acid, and 11.0% was recovered unchanged. The yield of acrylic acid based in acrolein consumed was 71.2%.

Example 4

291 parts by weight of cobalt nitrate was dissolved in 120 parts by weight of distilled water, and the solution heated to 60° C. 176.5 parts by weight of ammonium molybdate was dissolved in 520 parts by weight of distilled water at 60° C. the two solutions were mixed and well stirred. 217 parts by volume of piperidine (4.61 N aqueous solution) was added dropwise over 30 minutes and the temperature of the mixture kept between 55° to 60° C. The mixture was stirred for a further 15 minutes, after the addition was completed. The resultant mixture gave a pH of 5.3 with a glass electrode under the conditions specified above. The precipitate was filtered off, washed twice by resuspension with 1000 parts of distilled water and dried at 110° C. The resulting granules were ground to 8 mesh and heated at 600° C. for 16 hours. The heat treated material was ground to 30 mesh B.S.S. pelleted and the pellets heated at 600° C. for 16 hours.

A gaseous mixture of 10% by volume of acrolein, 10% by volume of oxygen, 50% by volume of nitrogen, and 30% by volume of steam was passed over the catalyst maintained in a reactor at 360° C., the contact time being 3.6 seconds.

Of the acrolein fed to the reatcor 61.7% was converted to acrylic acid, and 8.9% was recovered unchanged. The yield of acrylic acid based on acrolein consumed was 67.8%.

Example 5

Ammonium molybdate, 353.2 parts by weight, was ground to less than 30 mesh B.S.S. dissolved in 1040 parts by volume of distilled water at 60° C. and added to a solution of 582 parts by weight of cobalt nitrate dissolved in 240 parts by volume of distilled water at 60° C. The well stirred mixture was maintained at 60° C. whilst 420 parts by volume of a 4.77 N aqueous 1:2-diamino-ethane (ethylene diamine) solution was added dropwise over 30 minutes. The resultant mixture gave a pH of 4.8 with a glass electrode under the conditions specified above. The reaction mixture was then stirred for a further 15 minutes, the precipitate of cobalt molybdate filtered off, washed twice by resuspension in 1500 parts by volume of distilled water each time, and finally dried in air at 110° C. for 16 hours. The dried catalyst (453.4 parts by weight) was ground and sieved to less than 3 mesh B.S.S. and heated in granular form in air at 600° C. for 16 hours. The heated catalyst was then ground and sieved to less than 30 mesh B.S.S. and the powder formed into 3 mm. diameter pellets with the addition of 2% w./w. of graphite. Finally, the pelleted catalyst was heated at 600° for 16 hours in air.

A gaseous mixture consisting of acrolein, 10.5% by volume, oxygen 9.2% by volume, nitrogen 52% by volume and water vapour 27.7% by volume was passed over the catalyst described above at a reaction temperature of 378° C., the contact time being 3.46 seconds.

Of the acrolein fed 62.5% was converted to acrylic acid and 11.9% was recovered unchanged. The yield of acrylic acid based on acrolein consumed was 71.0%.

Example 6

A catalyst was prepared in an identical manner to the catalyst described in Example 5, except that 512 parts by volume of a 4.69 N aqueous ethylamine solution was used in place of the 420 parts by volume of a 4.77 N aqueous 1:2-diaminoethane (ethylene diamine) solution, the resultant mixture having a pH of 5.9 with a glass electrode under the specified conditions.

A gaseous mixture consisting of acrolein 9.7% by volume, oxygen 9.8% by volume, nitrogen 50.3% by volume and water vapour 30.2% by volume was passed over the catalyst at a reaction temperature of 380° C. the contact time being 3.58 seconds.

Of the acrolein fed 69.4% was converted to acrylic acid and 12.7% was recovered unchanged. The yield of acrylic acid based on acrolein consumed was 79.5%.

Example 7

119 parts of cobaltous chloride were dissolved in 150 parts of water at 60° C. and 88.8 parts of ammonium molybdate dissolved in 100 parts of water at 60° C.

The two solutions were mixed and 100 parts of a 5.14 N solution of ammonia representing 0.75 gramme-equivalents of ammonia per gramme-atom of cobalt, was added during 30 minutes. The precipitate was filtered and washed thoroughly with distilled water, dried at 80° C. and heated at 350° C. in air. The resulting powder was pelleted and heated at 540° C. for 16 hours. The catalyst, tested under the conditions of Example 1, gave a yield of acrylic acid, based on the acrolein consumed, of 67.5%. Of the acrolein fed to the reactor 64.5% was converted to acrylic acid.

Example 8

A catalyst was prepared as in Example 7 except that cobalt acetate (125 parts) was used in place of the cobalt chloride. After heat treatment at 540° C. for 16 hours, this catalyst gave on test under the conditions of Example 1, a yield of acrylic acid, based on the acrolein consumed, of 72%. Of the acrolein fed to the reactor 60.7% was converted to acrylic acid.

Example 9

This example illustrates the improved hardness of catalysts subjected to the two-stage heat treatment in accordance with the invention.

145.5 parts by weight of cobalt nitrate $(CO(NO_3)_2 \cdot 6H_2O$ and 88.8 parts by weight of ammonium molybdate $(NH_4)_6 MO_7O_{24} \cdot 4H_2O$ were dissolved in 320 parts by weight of water at 60° C., 108 parts by weight of a 5.14 N aqueous solution of ammonia, representing 1.15 gramme-equivalents of ammonia per gramme-atom of cobalt, was slowly added over a period of half an hour, and the mixture was stirred for a further 15 minutes. The resultant mixture gave a pH of 5 with a glass electrode under the conditions specified above. The precipitate was filtered off and washed twice by resuspension with 500 parts of distilled water. The precipitate was dried at 110° C., and the powder was subjected to a heat treatment at 400° C. for 16 hours, then pelleted and the pellets heated at 600° C. for 16 hours.

A second catalyst was made up under identical conditions except that it was subjected to a single heat treatment at 600° C. for 16 hours.

The table below shows that the two catalysts had about the same performance, but that the twice heated catalyst was harder. The hardness of the catalysts was compared by an attrition test in a rod mill under standard conditions.

TABLE 1

| No. of heat treatments of catalyst | Percent of acrylic acid based on acrolein fed | Percent of acrylic acid based on acrolein consumed | Hardness of catalyst |
|---|---|---|---|
| 1 | 59.2 | 66.9 | 73 |
| 2 | 60.4 | 71.6 | 80.2 |

What is claimed is:

1. A process for the production of an oxidation catalyst comprising an oxide composition containing cobalt, molybdenum and oxygen in which the atomic ratio of cobalt to molybdenum is not substantially greater than 1:1 which comprises adding ammonia or an aliphatic, aromatic or heterocyclic amine to a solution of a cobalt salt with a molybdenum compound selected from the group consisting of molybdic acid and molybdates of nitrogenous bases to obtain a solution of pH less than about 7, forming a precipitate in said solution, heating the said precipitate at about 350 to 650° C., forming said precipitate into pellets and heating said pellets to about 500 to 650° C., said heating steps being performed prior to use of said composition as a catalyst.

2. The process as claimed in claim 1 wherein the material subjected to the heat treatment steps is prepared by mixing an aqueous solution of a cationic cobalt salt with an aqueous solution of the molybdenum compound, and adding ammonia or an aliphatic, aromatic or heterocyclic amine to the aqueous mixture to form a precipitate.

3. The process as claimed in claim 1 wherein ammonia is used.

4. The process as claimed in claim 1 wherein an aliphatic amine is used.

5. The process a claimed in claim 4 wherein the aliphatic amine is selected from the group consisting of ethanolamine, ethylamine, triethylamine or ethylene diamine.

6. The process as claimed in claim 1 wherein the precipitated material is subjected to frictional forces prior to being pelleted.

References Cited

UNITED STATES PATENTS

| 2,570,882 | 9/1951 | Stiles | 252—472 |
| 3,087,964 | 4/1963 | Koch et al. | 252—470 |
| 3,098,102 | 7/1963 | Bethell et al. | 252—470 |

DANIEL E. WYMAN, *Primary Examiner.*

P. E. KONOPKA, *Assistant Examiner.*

U.S. Cl. X.R.

252—438; 260—530